Jan. 31, 1950 R. G. FISHEL 2,495,892

TELEPHONE DIALER

Filed March 6, 1947

Inventor:
Robert G. Fishel,
By Dawson, Booth and Spangenberg,
Attorneys.

Patented Jan. 31, 1950 2,495,892

UNITED STATES PATENT OFFICE 2,495,892

TELEPHONE DIALER

Robert G. Fishel, Chicago, Ill.

Application March 6, 1947, Serial No. 732,733

4 Claims. (Cl. 179—90.5)

This invention relates to telephone dialers for dial type telephones.

The principal object of this invention is to provide a telephone dialer which may be readily removably mounted on the finger guard of the dial type telephone to avoid misplacing of the same, which may be readily grasped and removed and manipulated for dialing purposes with a minimum of effort, which enhances the appearance of the telephone, and which may be provided with pleasing and ornamental designs, monograms, or advertizing material. If desired, the dialer may also be provided with a writing device for readily jotting down notations, etc.

In carrying out this object of the invention, the dialer may include a substantially wide body portion provided with a notch for receiving the finger guard of the telephone to locate the body portion partially behind the dial of the telephone but permitting manual grasping of the same and with an extension substantially opposite the notch to be engaged in the finger holes of the dial upon manual manipulation of the dialer for dialing purposes. The notch cooperating with the wide body portion provides for ready and simple mounting and removing of the dialer on the telephone. The extension located substantially opposite to the notch and the wide body portion permits removal of the dialer and subsequent dialing operation with substantially a single manual manipulation. The wide body portion permits the use of designs, monograms, advertizing and the like on the dialer. The dialer may be inexpensively manufactured in thin flat form or the outer part thereof may be made relatively thick to enhance the appearance thereof and to facilitate manual manipulation thereof. The thick outer part of the dialer or the thick extension thereof may be provided with a writing device for jotting down notations and this writing device may be made retractable.

Other objects and advantages will become apparent to those skilled in the art upon reference to the accompanying specification, claims, and drawing in which—

Figure 1:
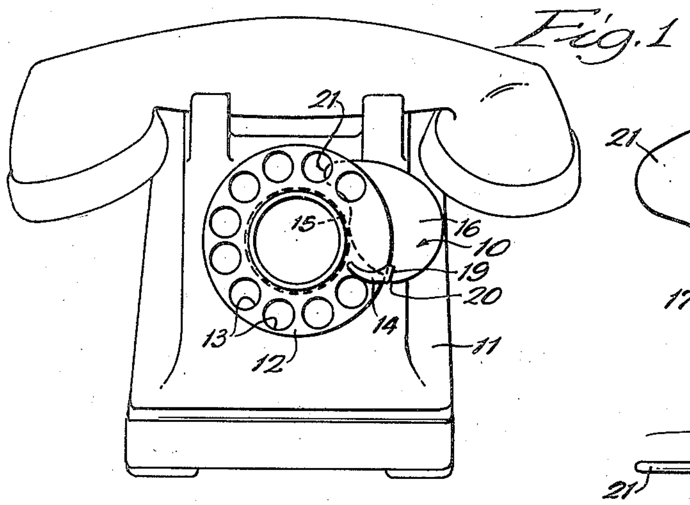
Figure 1 is a front elevational view of a dial type telephone with one form of the telephone dialer mounted thereon.

Referring first to Fig. 1, the dialer of one form of the invention is designated at 10 and it is shown as applied to a dial type telephone having a base 11, a dial 12 provided with finger holes 13, and a finger guard 14. In the dial type telephone, the dial 12 is rotatably mounted within a sleeve behind the dial and positioned as at 15.

Figure 3:
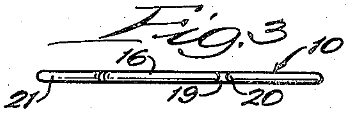
Figure 3 is a view looking from the bottom of Fig. 2.

The dialer 10 includes a substantially wide body portion 16, and the body portion may be uniformly thin in the form of a disk, as illustrated in Fig. 3. It has an inner portion 17 which normally is received behind the dial 12 of the telephone and an outer portion 18 which is adapted to be manually grasped. The body portion 16 is provided with a notch 19 adapted to receive the finger guard 14, and the body portion on one side of the notch 19 is preferably extended as at 20 to assist in mounting the dialer on the finger guard of the telephone. The body portion is also provided with an extension 21 adapted to be received in the finger holes 13 of the dial for dialing purposes. The extension 21 is substantially opposite the notch 19. The body portion 16 being relatively wide may readily be provided with ornamental designs, monograms, advertizing material and the like.

In removably placing the dialer 10 upon the finger guard 14 of the telephone, the inner part 17 is inserted behind the dial 12 and the inner edge may be brought against the sleeve behind the dial for guiding the notch 19 over the finger guard 14. The extension 20 adjacent the notch 19 assists in locating the notch 19 with respect to the finger guard 14. Thus, the dialer 10 may be readily removably mounted on the finger guard 14 of the telephone, and in such location of the dialer, misplacing of the dialer is thereby avoided.

When it is desired to perform a dialing operation, the dialer 10 is manually grasped at the outer part 18 of the body portion 16 and is lifted off the guard 14. When so grasped, the extension 21 is so located that it is a simple matter to insert the same in the desired finger holes 13 of the dial 12 to perform the dialing operation. After the dialing operation is completed, the dialer 10 remains in such position in the hand of the user that it may be readily replaced upon the finger guard 14 with a minimum amount of effort. Thus, substantially only one manual movement is required to remove the dialer 10 from the finger guard 14 and begin the dialing operation, and when the dialing operation is completed, no shifting of the dialer in the hand is necessary to replace the dialer on the finger guard 14. The use of the dialer 10 is, therefore, extremely simple and it has been found that after the dialer has been used for a relatively short period of time, it becomes almost indispensible.

Figure 4:
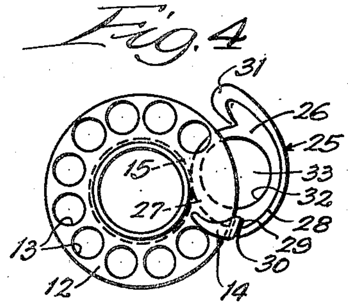
Figure 4 is a view illustrating another form of the dialer associated with a telephone dial.
Figure 5:
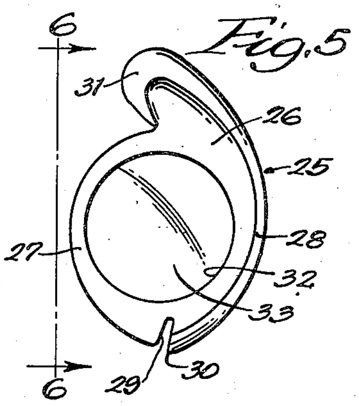
Figure 5 is an enlarged elevational view of the dialer of Fig. 4.
Figure 6:
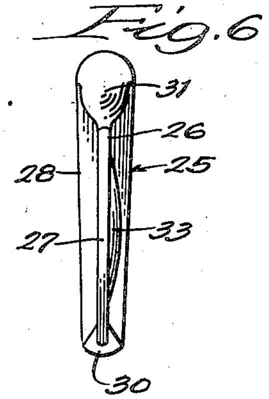
Figure 6 is a view looking from the left in Fig. 5.

Another form of dialer is generally designated at 25 in Figs. 4, 5, and 6. It includes a body portion 26 with a relatively thin inner part 27 and a relatively thick outer part 28. A notch 29 is provided in the body portion 26 at the thin part thereof, and the thick part 28 of the dialer may extend beyond the notch 29, as indicated at 30. The thick part 28 of the dialer may also be provided with a relatively thick extension 31 to be received in the finger holes 13 of the dial 12. Here, as in the arrangement of Figs. 2 and 3, the extension is substantially opposite the notch. The body portion 26 may be provided with a circular recess 32 for receiving a disk 33 provided with suitable ornamental design, monogram, or advertizing material. Various types of ornamental designs, monograms, or advertizing material may, therefore, be interchangeably provided.

Figure 2:
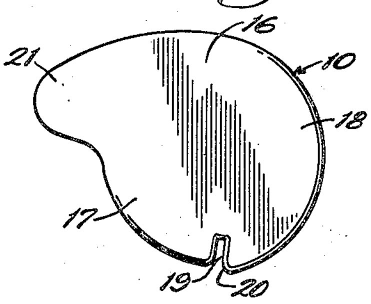
Figure 2 is an elevational view of the dialer of Fig. 1.

The manner of use of the form of dialer of Figs. 4, 5, and 6 is the same as that of Figs. 1, 2 and 3 and the same beneficial results are obtained thereby. The relatively thick portion 28 and the relatively thick extension 31 provide for somewhat easier manual manipulation of the dialer and in this respect the dialer of Figs. 5 and 6 represents an improvement over that of the dialers of Figs. 2 and 3. Furthermore, the relatively thick portions operate to enhance the ornamental characteristics of the dialer 25.

Figure 7:
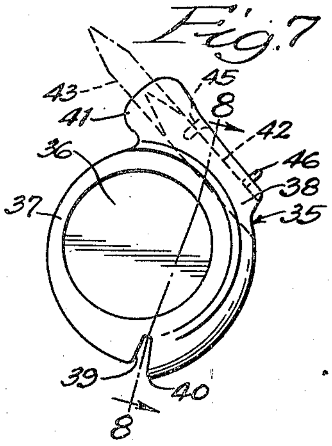
Figure 7 is an elevational view of another form of dialer including a writing device.
Figure 8:
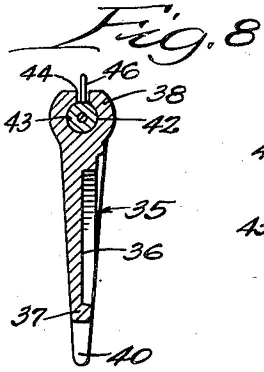
Figure 8 is a sectional view through the dialer taken substantially along the line 8—8 of Fig. 7.
Figure 9:
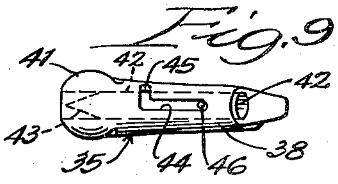
Figure 9 is a top plan view of the dialer of Fig. 7.

A further form of the dialer is illustrated in Figs. 7, 8, and 9. Here the dialer is generally designated at 35 and includes a substantially wide body portion 36 having a relatively thin inner part 37 and a relatively thick outer part 38. A notch 39 is provided at the relatively thin part of the dialer and the body portion is extended beyond the notch 39 as indicated at 40. The relatively thick part of the dialer is provided with an extension 41 which also is located substantially opposite the notch. The extension 41 is adapted to be received in the finger holes 13 of the dial for dialing purposes; and the manner of dialing and mounting the dialer on the telephone is the same as that pointed out above in connection with Figs. 1 to 6. The same beneficial results are obtained.

The extension 41 and the enlarged part 38 are provided with a bore 42 for receiving a writing device such as a pencil 43. The pencil is preferably of the mechanical type. The body portion adjacent the bore 42 is provided with a longitudinal slot 44 terminating in a side slot 45 for receiving a pin 46 carried by the writing device 43. The pin 46 may be manually manipulated in the slot 44 for retracting or extending the writing device 43. When the pin 46 is in the rear part of the slot 44, the writing device is retracted, as illustrated in Fig. 9. But when the pin 46 is moved forwardly into the slot 45, the writing device is extended and held in extended position for writing purposes. The writing device is preferably retracted during the dialing operation, but may be readily extended for the purpose of jotting down notations, etc.

While for purposes of illustration, several forms of this invention have been disclosed, other forms thereof may become apparent to those skilled in the art upon reference to this disclosure and, therefore, this invention is to be limited only by the scope of the appended claims and prior art.

I claim as my invention:

1. A telephone dialer for a dial type telephone comprising a substantially wide body portion provided at its edge with a substantially rectangular notch conforming to and receiving the finger guard of the telephone removably to support the body portion on the finger guard partially behind the dial of the telephone and partially beyond the dial for permitting manual grasping of the same, and an extension on the edge of the body portion substantially opposite the notch to be engaged in the finger holes of the dial upon manual manipulation of the dialer for dialing purposes.

2. A telephone dialer for a dial type telephone comprising a substantially wide and uniformly thin body portion provided at its edge with a substantially rectangular notch conforming to and receiving the finger guard of the telephone removably to support the body portion on the finger guard with the inner part of the body portion behind the dial of the telephone and the outer part of the body portion beyond the dial for permitting manual grasping of the same, and a thin extension on the edge of the body portion substantially opposite the notch to be engaged in the finger holes of the dial upon manual manipulation of the dialer for dialing purposes.

3. A telephone dialer for a dial type telephone comprising a substantially wide body portion having a relatively thin inside part and a relatively thick outside part, a substantially rectangular notch conforming to the finger guard of the telephone and formed in the edge of the thin part of the body portion for receiving the finger guard removably to support the body portion on the finger guard with the relatively thin inside part of the body portion behind the dial of the telephone and the relatively thick outside part of the body portion beyond the dial for permitting manual grasping of the same, and a relatively thick extension on the edge of the thick outside part of the body portion substantially opposite the notch to be engaged in the finger holes of the dial upon manual manipulation of the dialer for dialing purposes.

4. A telephone dialer for a dial type telephone comprising a substantially wide body portion having a relatively thin inside part and a relatively thick outside part, a substantially rectangular notch conforming to the finger guard of the telephone and formed in the edge of the thin part of the body portion for receiving the finger guard removably to support the body portion on the finger guard with the relatively thin inside part of the body portion behind the dial of the telephone and the relatively thick outside part of the body portion beyond the dial for permitting manual grasping of the same, a relatively thick extension on the edge of the thick outside part of the body portion substantially opposite the notch to be engaged in the finger holes of the dial upon manual manipulation of the dialer for dialing purposes and a writing device retractably received in the relatively thick extension.

ROBERT G. FISHEL.

REFERENCES CITED

The following references are of record in the file of this patent:

UNITED STATES PATENTS

| Number | Name | Date |
|---|---|---|
| 1,664,939 | Mortimer | Apr. 3, 1928 |
| 1,671,102 | Dickman | May 29, 1928 |
| 1,736,430 | Deli | Nov. 19, 1929 |
| 1,906,292 | Warren | May 2, 1933 |
| 2,285,286 | Kirkman | June 2, 1942 |